United States Patent [19]

Lawton

[11] 4,209,666
[45] Jun. 24, 1980

[54] MULTIPLEXING SYSTEM LINE FAULT ISOLATION AND IDENTIFICATION

[76] Inventor: Richard A. Lawton, 51 Inverlochy Blvd., Unit #1, Thornhill, Ontario, Canada

[21] Appl. No.: 948,312

[22] Filed: Oct. 3, 1978

[51] Int. Cl.² .............................................. H04J 3/14
[52] U.S. Cl. .............................. 370/13; 179/175.3 F
[58] Field of Search ....... 179/15 BF, 15 AL, 175.3 F, 179/18 EA; 340/146.1 BE

[56] References Cited

U.S. PATENT DOCUMENTS 3,859,468   1/1975   Smith et al. ..................... 179/15 BF Primary Examiner—Bernard Konick
Assistant Examiner—Joseph A. Popek
Attorney, Agent, or Firm—Ridout & Maybee

[57] ABSTRACT

In a multiplex signalling system for two-way data transmission over a single transmission line, the line is configured as a loop terminating at each end at a central or control station, thereby furnishing two communication paths between the central station and each of a plurality of remote stations distributed along the line. Transmission of signals from the central station and reception of signals at the control station are duplicated at the line ends so that an open line fault can readily be identified from an analysis of signals received at the central station. Switches at the remote stations operable in accordance with reception of signals along both communication paths serve to isolate and identify line ground faults.

4 Claims, 6 Drawing Figures

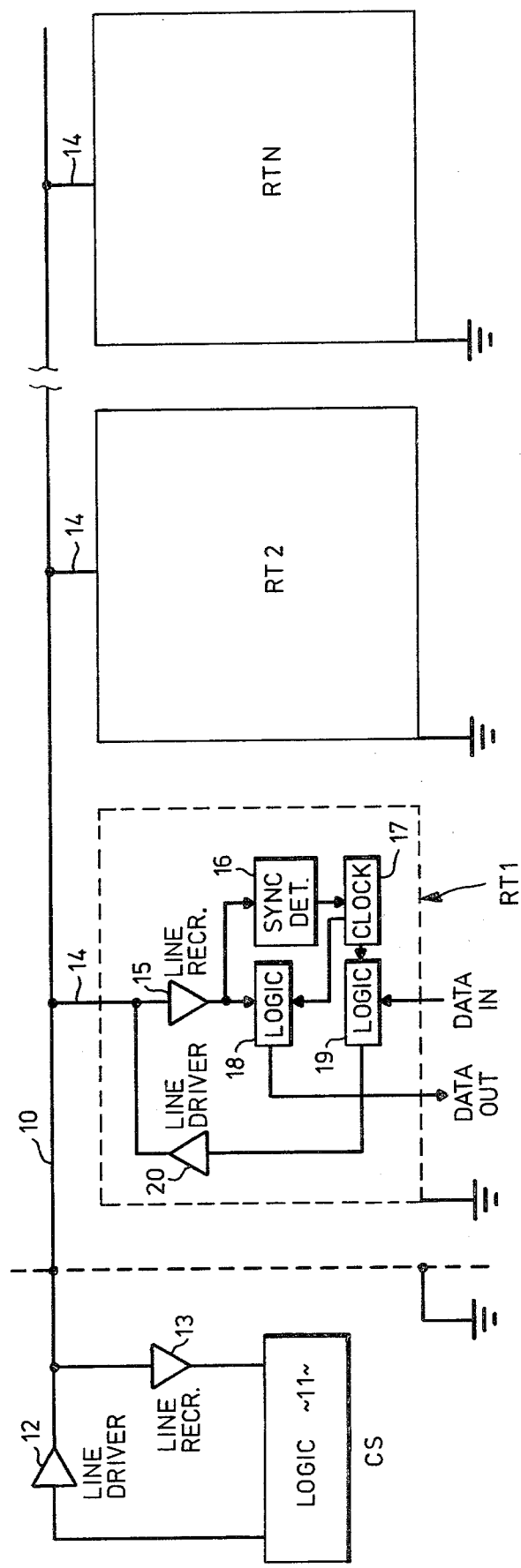
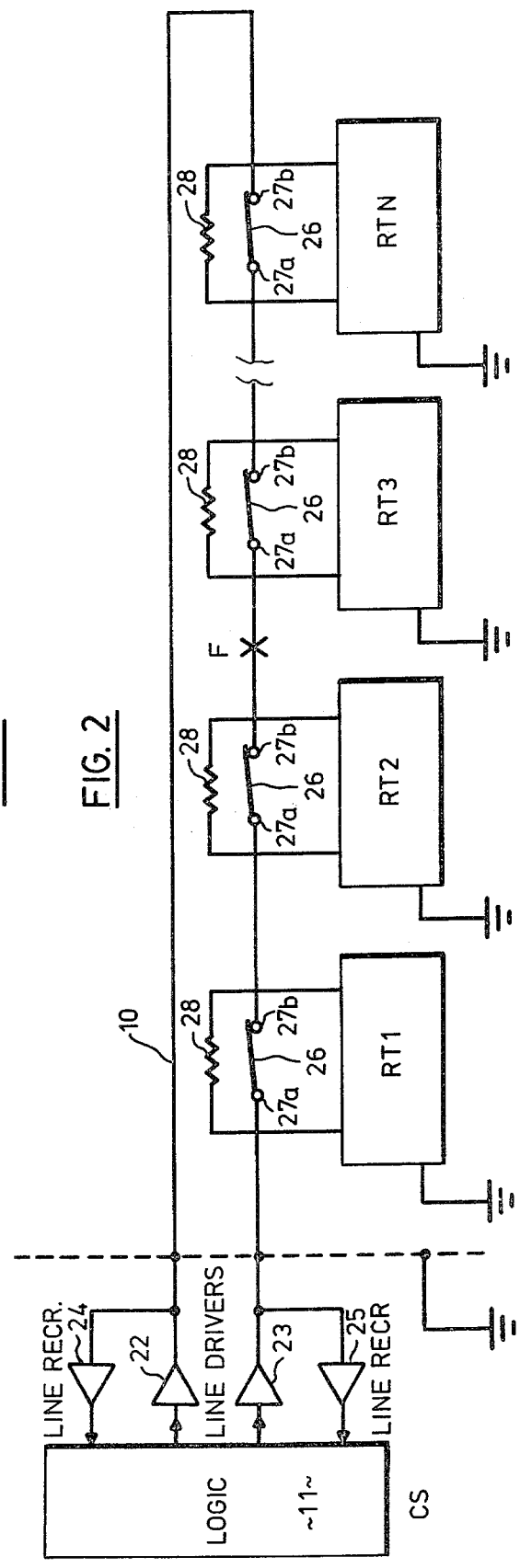
FIG. 1
FIG. 2

MULTIPLEXING SYSTEM LINE FAULT ISOLATION AND IDENTIFICATION

FIELD OF THE INVENTION

This invention relates to multiplexing systems for the two-way transmission of data over a single transmission line between a control station and a plurality of remote transponder units serially interconnected in the line, the control station including transmitter-receiver means for selectively addressing the transponder units and receiving response signals therefrom. Systems of this type are used in burglar alarm systems, fire alarm systems, telemetering systems and other applications in which two-way digital data transmission over wired signal channels is required.

Although the preferred embodiment of the invention described herein uses pulse mode signalling, the invention is not restricted to this mode of signal transmission but may equally well use tone signals or high frequency carrier signals.

BACKGROUND OF THE INVENTION

Systems of the type referred to, in which the remote transponder units are serially interconnected along the transmission line, are vulnerable to line faults which may occur anywhere on the line. Although the presence of an open line fault or a ground fault may readily be apparent, the fault may be difficult to identify and locate, especially in the case of a long line. Moreover, until the fault has been rectified the signalling capability of the system will generally be seriously reduced, presenting a serious problem where a high degree of security is required, as in a burglar alarm or a fire alarm system.

It is an object of the present invention to provide a multiplex signalling system for the two-way transmission of data over a single transmission line, having means for automatically isolating a line fault while maintaining full signalling capability while the fault exists.

It is another object of the invention to provide in such a system means whereby the fault may readily be located from the control station.

SUMMARY OF THE INVENTION

According to the invention, in a multiplexing system for two-way data transmission over a single transmission line between a control station and a plurality of remote transponder units serially interconnected in said line, the control station including transmitter-receiver means for selectively addressing the transponder units and receiving response signals therefrom, the transmission line is configured as a loop terminating at each end at the control station. The transmitter-receiver means at the control station is coupled to respective ends of the transmission line for transmitting address signals to the transponder units and receiving response signals therefrom, the transmission line thereby furnishing two communication paths between the control station and each transponder unit. For fault location, the transmitter-receiver means may include means, such as a pair of independent line receivers, for differentiating between response signals received via the two communication paths.

It will be understood that, although the address signals are fed in at the two ends of a single transmission line, the signals will in practice be fed into a finite impedance which is the line impedance.

To deal with ground faults, particularly, each transponder unit is preferably connected to the line by a line connection circuit, the line connection circuit comprising a two-state impedance device, such as a normally open switch bridged by a bleed impedance, with means for switching automatically from a high impedance state to a low impedance state in response to the reception of address signals concurrently via the two communication paths.

BRIEF DESCRIPTION OF THE DRAWINGS

One preferred embodiment of the invention will now be described, by way of example, with reference to the accompanying drawings, in which:

FIG. 1 is a schematic diagram of a known multiplexing system of the general type to which this invention relates;

FIG. 2 is a schematic diagram of a multiplexing system in accordance with the invention;

DESCRIPTION OF THE PREFERRED EMBODIMENT

Figure 3:
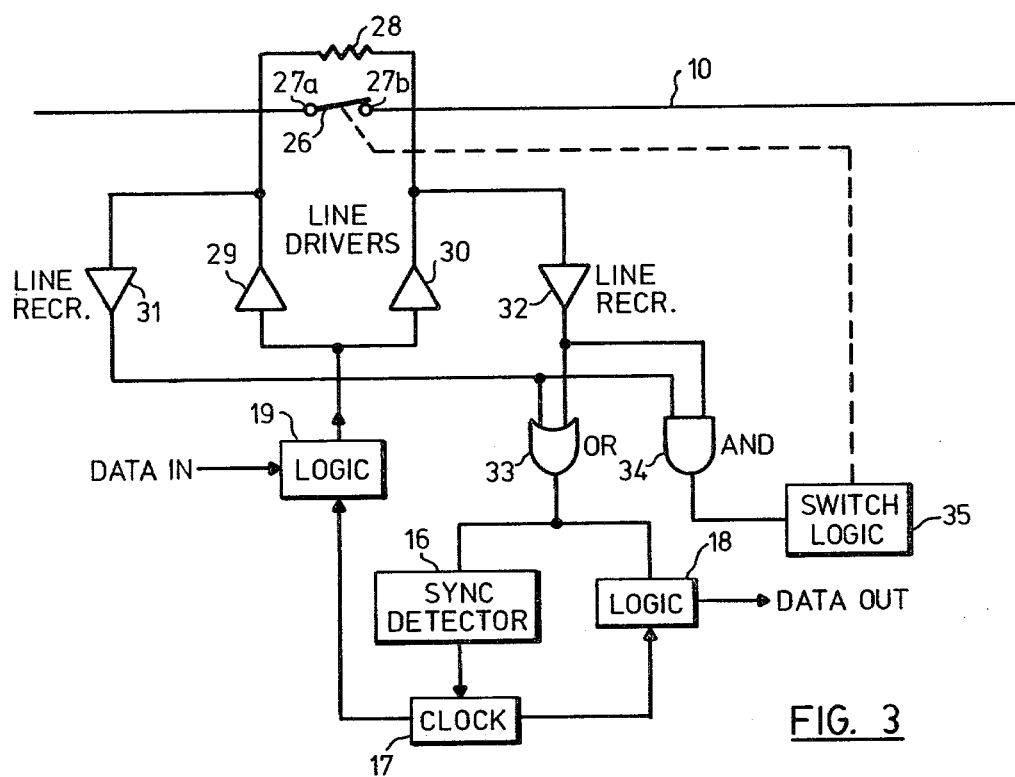
FIG. 3 is a schematic diagram of a transponder unit as employed in the system of FIG. 2.

The prior art is represented by FIG. 1, which illustrates a multiplex signalling system for two-way data transmission over a single transmission line 10 between a control station CS and a plurality of serially interconnected remote transponder units RT1, RT2—RTN distributed along the line. The control station CS includes a transmitter-receiver means for selectively addressing the transponder units and receiving response signals therefrom. By suitable multiplexing, depending upon the type of signalling employed, the transponder units may be addressed in turn individually, each of the units producing a response indicating a particular condition which is being monitored by the control station, for example whether a door is open or closed, or whether smoke exists in a particular area. For example, in the case of a pulse mode of signalling the control station will include a transmitter 11 including means for generating interrogation pulses and synchronization codes for addressing the respective transponder units, each transponder unit being responsive to a particular synchronization code allocated to it. These address signals are generated in accordance with a pre-arranged program and fed into the transmission line 10 by means of a line driver 12. The response signal from the addressed transponder unit is received from the transmission line 10 via a line receiver 13 and processed by logic circuitry in the unit 11. The transponder units are serially interconnected in the line 10 by line connection circuits 14. Each transponder unit includes a line receiver 15 for receiving the appropriate address signal transmitted from the control station CS, a synchronization code detector 16 for recognizing the allotted synchronization code, which in response to the code recognition controls a clock 17 by which logic circuitry 18 analyses the interrogation signal for feeding interrogation data out. In response to the interrogation data an appropriate analog device (not shown) feeds a response signal via an analog-digital converter (not shown) to logic circuitry 19, the response being transmitted to the line 10 as pulse data under the control of clock 17 and via a line driver 20. With such a pulse mode of signalling, which is well known, many remote stations can be monitored from a central or control station at a high cycle frequency.

A drawback of the system, if high security is a requirement, is that a line fault will render the system wholly or partly inoperative while the fault exists, and the fault may not easily be located. Thus, an open line fault between transponder units RTN and RTN+1 will isolate all units beyond the unit RTN from the control station, while a ground fault will isolate all units beyond the point at which the line connection circuits are not effectively grounded.

Referring now to FIGS. 2 and 3, showing a system in accordance with the present invention, the problem of an open line fault is solved by configuring the transmission line 10 as a loop terminating at each end at the central station CS, and duplicating the transmitter-receiver means at the central station. At the central station a pair of line drivers 22, 23 feed into the transmission line at both its ends, so that the address signals are received by all the transponder units RT1—RTN, regardless of the location of an open line fault F. Moreover, since each transponder unit is addressed, it can respond by transmitting response signals to the central station via one or other of a pair of line receivers 24, 25, regardless of the position of fault F. In the case of an open line fault, therefore, each of the line receivers receives responses from a particular set of transponders, depending upon where the fault is located, and since the transponders are identified by their synchronization codes the fault can readily be located by differentiating between the response signals received by the two line receivers over a scanning cycle. Thus, a very important feature of the invention is that, while the fault exists, the system has full signalling capability.

To identify and locate a ground fault, or combination of ground fault and open fault, while maintaining full signalling capacity in the system, more is required.

To this end, each of the transponder units RT1—RTN includes a line connection circuit having a two-state impedance which, in the exemplary embodiment of the invention, is represented by a normally open switch 26 providing a pair of line terminals 27a, 27b which are bridged by a bleed resistor 28. The switches 26 are serially interconnected in the line 10, as shown in FIG. 2, so that when all the switches are closed the transmission line forms a complete loop in the absence of a fault. A pair of line drivers 29, 30, (FIG. 3) having a common input receive the response data to be transmitted to the control station, the common input being fed from logic circuitry 19. The logic circuitry 19 for determining the response data to be transmitted, the synchronization code detector 16, the clock 17 and logic circuitry 18 for determining data out are quite conventional and need not be discussed in further detail. It should be noted, however, that the response data is transmitted to the line via the line drivers 29, 30 on opposite sides of the switch 26. Similarly, address signals are received from the line on opposite sides of the switch 26 via a pair of line receivers 31, 32. The received signals are fed via an OR gate 33 to the synchronization code detector 16 and logic circuitry 18, and are processed in the conventional manner; in this case, however, only one of the line receivers need be operative.

The outputs of the line receivers 31, 32 are also fed to an AND gate 34, to which a switch operating mechanism 35 is connected for operating the switch 26. Only when address signals are received by both line receivers 31, 32 will the output of AND gate 34 be high, and only in such a case will the switch logic operating mechanism 35 permit the switch 26 to remain closed.

In the case of an open line fault the system will operate as previously described with reference to FIG. 2. In the case of a ground fault, however, say at point F, the line receiver 32 of transponder unit RT2 and the line receiver 31 of transponder unit RT3 will be grounded at their inputs and so will not receive the signals. However, since the switches 26 are open, the line receiver 32 of transponder unit RT3 and the line receiver 31 of transponder unit RT2 will recieve signals, and so the system will remain fully operative. The transmission loop will maintain two continuous communication paths from the two ends of the line by reason of the fact that the switches 26 of all the transponder units except RT2 and RT3 will be closed. This is ensured by the fact that the bleed resistors 28 of all the units except RT2 and RT3, which are adjacent to the fault, will provide an input signal to both line receivers, thereby causing the switch operating mechanisms 35 to close their respective line switches. The line switches of the units RT2 and RT3, however, will remain open, since each has one receiver with a grounded input, and in consequence the location of the ground fault can readily be determined from an analysis of the responses at the control station as in the case of an open line fault. As before, the full signalling capacity of the system is maintained.

Figure 4:
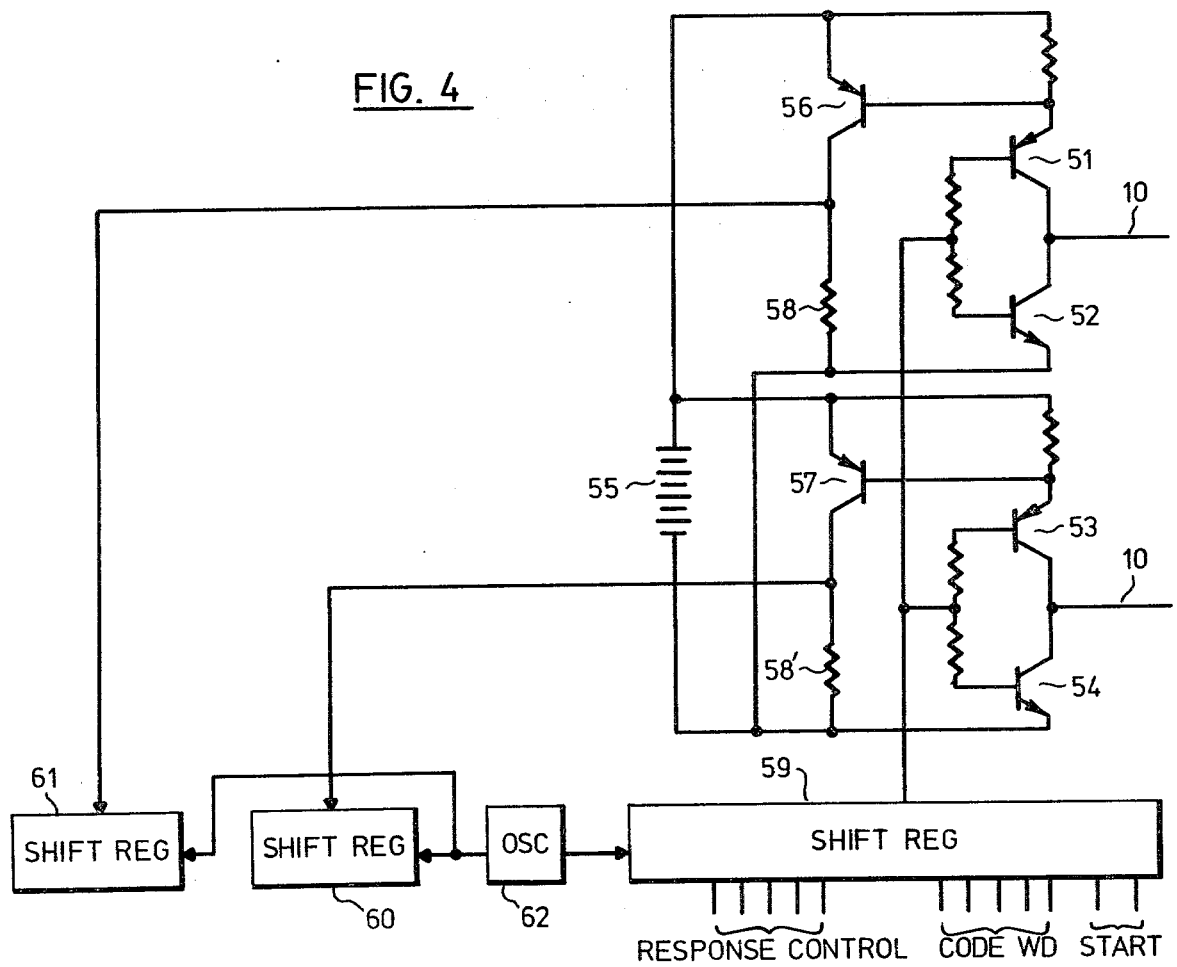
FIG. 4 illustrates details of the central or control station.

The operations at the control station will now be described with reference to FIGS. 4 and 5. Referring first to FIG. 4, the line drivers 22, 23 of FIG. 2 are represented by pairs of transistors 51, 52 and 53, 54, respectively, the transistors being supplied from a common current source 55. The line receivers 24, 25 are represented by transistors 56, 57 also supplied from the current source 55. The logic circuitry of the transmitter 11 of FIG. 2 is represented by an input shift register 59 for data to be transmitted via the line drivers, a pair of output shift registers 60 and 61 for response data received via the two communication channels, and an oscillator 62 serving as a clock generator. The oscillator 62 clocks the shift register 59 so that parallel data is presented in serial form to the line drivers 51, 52 and 53, 54. If the output of the shift register 59 is high, the transistors 52 and 54 are turned on, causing zero volts to be applied to both communication channels of the line 10. If the output of the shift register 59 is low, the transistors 51 and 53 are turned on, thus causing a positive voltage to be applied to both communication channels. Resistors 58, 58' in series with the line receiver tansistors 56, 57 sense the current on the line 10 when transistors 51, 53 are on, and transistors 56, 57 are turned on when this current is sufficient to cause base current to flow. When the line current exceeds this predetermined value, the outputs from the communication channels of the transmission line, or one such output in the case of a line fault, will be high. Thus the information transmitted by the remote transponder units is received as serial data, which data is clocked by the oscillator 62 into the output shift registers 60 and 61. The stored data in each of the shift registers 60 and 61 represents information received via the respective communication channel from the transponder unit which is currently being addressed.

Figure 5:
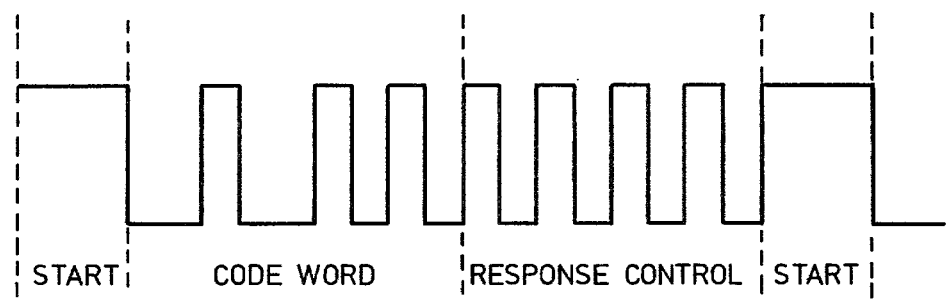
FIG. 5 is a timing diagram illustrating the organization of input data at the central or control station.

As illustrated in FIG. 5, input data to the shift register 59 consists of a start pulse, a code word for addressing a selected transponder unit, the code word changing from cycle to cycle so that the transponder units are addressed in cyclic sequence, and pulses for the receipt of response data.

The operations at a transponder unit will now be described with reference to FIG. 6, which corresponds to FIG. 3 and shows the normally open switch 26 having line terminals 27a, 27b, the bleed resistor 28, the line drivers 29, 30 represented by a pair of transistors, the OR gate 33 and the AND gate 34. These elements are connected as described with reference to FIG. 3. The switch 26 is electromagnetically operated, having an operating coil 26a which is normally energized to hold the switch open; an obvious alternative, however, would be to have the switch mechanically biassed to the open condition, the coil normally not being energized but operable to close the switch. In each case the switch would be functionally a "normally open" switch. The line receivers 31 and 32 are not shown as separate elements, but these are in fact incorporated in the inputs to the gates 33 and 34.

The synchronization code detector 16 of FIG. 3 is represented as a pulse width detector 71 which receives the output of OR gate 33 and sets a flip flop 72. When a pulse of the correct duration, or a series of pulses of the required form, is received by the pulse width detector, its output causes the flip flop 72 to be set. The oscillator 73, corresponding to clock 17 of FIG. 3, is thus enabled and pulses therefrom at the clock rate are fed to a pulse counter 74 and shift registers 75 and 76. Data pulses from the OR gate 33 are clocked through the shift register 75 until the parallel output of the latter contains the code word transmitted from the control station via the transmission line. The code word is compared with a predetermined code word stored in a word comparator 77 and, if these match, a high signal is clocked into a flip flop 78 by means of an output from the pulse counter 74. The output of flip flop 78 thus indicates whether the transmitted code matches the internal code, and so is used to enable or disable the transmission of response data from shift register 76 via the line drivers 29, 30. At the end of the cycle the flip flop 72 is reset by a pulse from a second output of the pulse counter 74.

Figure 6:
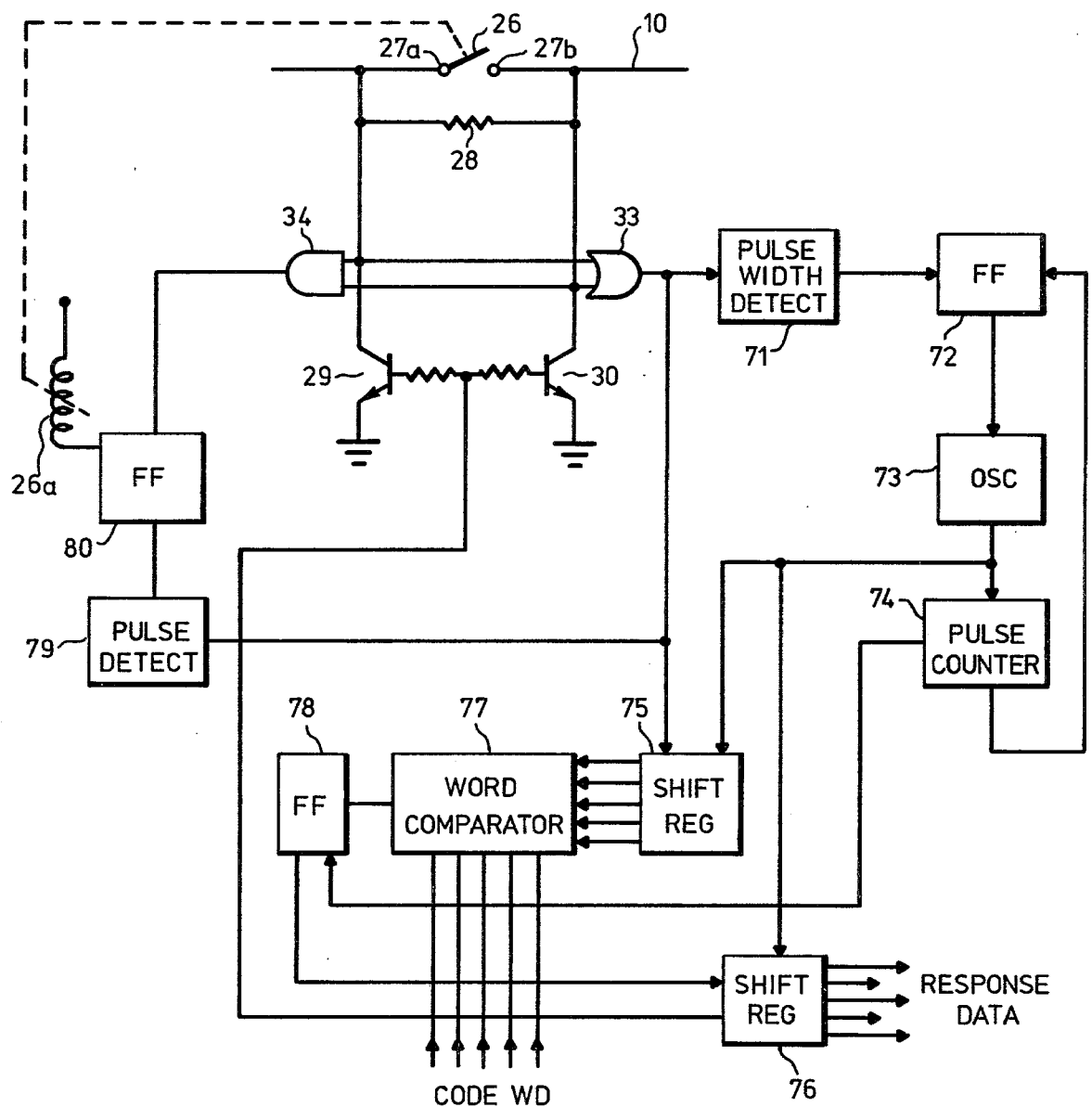
FIG. 6 is a schematic diagram illustrating in greater detail the organization of circuitry at a transponder unit.

The switch logic 35 of FIG. 3 is represented in FIG. 6 by a pulse detector 79 and a flip flop 80, the output of the latter being connected to the switch coil 26a for operating the switch 26. In the absence of a line fault, both inputs of the OR gate 33 and AND gate 34 receive data pulses. However, if the transmission line is opened or grounded in such a way that pulses are not received at all, the pulse detector will sense the absence of pulses on the output of OR gate 33 and will set the flip flop 80. The coil 26a will thereupon be energized causing switch 26 to open or to remain open. When communication with the control station is restored on a communication channel on one side of the switch 26, current is conducted via the bleed resistor 28 to the other side of the switch; accordingly, if this other side of the switch is not also grounded, a sufficient signal is applied to both inputs of AND gate 34. The gated output of AND gate 34 thereupon resets the flip flop 80, thus de-energizing the coil 26a and causing switch 26 to close.

If a ground fault occurs on one side of the switch 26 and adjacent to it, the coil 26a will remain energized and switch 26 will remain open until the fault has been cleared.

What I claim is:

1. A multiplexing system for two-way data transmission over a single transmission line between a control station and a plurality of remote transponder units, the control station including transmitter-receiver means for selectively addressing the transponder units and receiving response signals therefrom, wherein the transmission line is configured as a loop terminating at each end at the control station, the transmitter-receiving means being coupled to respective ends of the transmission line for transmitting address signals to the transponder units and receiving response signals therefrom, the transmission line thereby furnishing two communication paths between the control station and each transponder unit, said transmitter-receiver means including means for differentiating between response signals received via the two ends of the line, and the transponder units being distributed along the transmission line and connected thereto by respective line connection circuits each comprising:

a two-state impedance device having high and low impedance states, the devices of the respective units being serially interconnected in said line, respective output means connected to the line on opposite sides of the impedance device for transmitting said response signals via the two communication paths, respective input means connected to the line on opposite sides of the impedance device for receiving address signals transmitted via the two communication paths, and logic circuit means coupled to said input means and operable in response to address signals received by both input means to switch said impedance device from a high to a low impedance state.

2. A multiplexing system according to claim 1, wherein said transmitter-receiver means includes a pair of line drivers connected to respective ends of the line for transmitting said address signals along the two communication paths, and a pair of line receivers connected to the respective ends of the line for separately receiving said response signals.

3. A multiplexing system according to claim 2, wherein each transponder unit includes a line connection circuit comprising:

a normally open switch providing a pair of line terminals bridged by a bleed impedance, the switches of the respective units being serially interconnected in said line, a pair of line drivers having a common input and connected respectively to the line terminals for transmitting response signals to the line at either side of the switch, a pair of line receivers connected respectively to the line terminals for receiving address signals from the line on either side of the switch, AND-gate means coupled to the line receivers for gating the received addressed signals, and switch operating means connected to said AND-gate means for operating the switch in accordance with the gating of said received address signals.

4. A multiplexing system according to claim 3, wherein the switch is an electromagnetic switch having an energizing coil operable in accordance with the gating of said received address signals to close the switch.

* * * * *